United States Patent
Yue et al.

(10) Patent No.: US 11,584,878 B1
(45) Date of Patent: Feb. 21, 2023

(54) ACID PRECURSORS FOR ENHANCED INHIBITOR PLACEMENT IN SCALE SQUEEZE TREATMENTS

(71) Applicant: Halliburton Energy Services, Inc., Houston, TX (US)

(72) Inventors: Zhiwei Yue, Houston, TX (US); Ping Chen, Dhahran (SA); Hui Zhou, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/553,303

(22) Filed: Dec. 16, 2021

(51) Int. Cl.
*E21B 37/06* (2006.01)
*C09K 8/528* (2006.01)

(52) U.S. Cl.
CPC .............. *C09K 8/528* (2013.01); *E21B 37/06* (2013.01)

(58) Field of Classification Search
None
See application file for complete search history.

(56) References Cited

U.S. PATENT DOCUMENTS

| | | | |
|---|---|---|---|
| 3,868,998 A | 3/1975 | Lybarger et al. | |
| 4,357,248 A * | 11/1982 | Berkshire | C02F 5/14 507/236 |
| 6,527,983 B1 * | 3/2003 | Stewart | C02F 5/14 252/387 |
| 6,877,563 B2 | 4/2005 | Todd et al. | |
| 7,484,564 B2 | 2/2009 | Welton et al. | |
| 7,943,058 B2 | 5/2011 | Hills et al. | |
| 8,016,034 B2 | 9/2011 | Glasbergen et al. | |
| 8,207,095 B2 | 6/2012 | Welton | |
| 2007/0125987 A1 * | 6/2007 | Hills | C23F 14/00 422/7 |
| 2009/0025933 A1 * | 1/2009 | Garcia-Lopez de Victoria | C09K 8/74 507/221 |
| 2011/0028358 A1 * | 2/2011 | Welton | C09K 8/03 507/236 |
| 2013/0281329 A1 * | 10/2013 | De Wolf | C09K 8/035 562/571 |

(Continued)

FOREIGN PATENT DOCUMENTS

| | | |
|---|---|---|
| WO | 2005000747 | 1/2005 |
| WO | 2009138733 | 11/2009 |

OTHER PUBLICATIONS

Sorbie, K.S.; Yuan, Ming Dong; Chen, Ping; Todd, A.C.; Wat, R.M.S. (). [Society of Petroleum Engineers SPE International Symposium on Oilfield Chemistry—New Orleans, Louisiana (Mar. 2, 1993)] SPE International Symposium on Oilfield Chemistry—The Effect of pH on the Adsorption and Transport of Phosphonate Scale Inhibitor Through Porous Media. SPE 25165.

(Continued)

*Primary Examiner* — Andrew Sue-Ako
(74) *Attorney, Agent, or Firm* — Thomas Rooney; C. Tumey Law Group PLLC

(57) ABSTRACT

A variety of methods, systems, and compositions are disclosed, including, in one embodiment, method of scale inhibition including: introducing a treatment fluid comprising a brine, a scale inhibitor in neutralized form, and a thermally activated acid precursor through a wellbore and into a producing formation; wherein the thermally activated acid precursor is heated to release an acid that enhances miscibility of the scale inhibitor in the brine.

20 Claims, 3 Drawing Sheets

(56) References Cited

U.S. PATENT DOCUMENTS

| | | | |
|---|---|---|---|
| 2014/0069644 A1* | 3/2014 | Reddy | C09K 8/00 166/305.1 |
| 2015/0076820 A1 | 3/2015 | Pendray et al. | |
| 2016/0273329 A1 | 9/2016 | Weider et al. | |
| 2017/0342309 A1 | 11/2017 | Yue et al. | |
| 2019/0093007 A1 | 3/2019 | Beuterbaugh et al. | |
| 2020/0032135 A1 | 1/2020 | Zhou et al. | |

OTHER PUBLICATIONS

Bourne, Hugh M.; Booth, Steven L.; Brunger, Alan (). [Society of Petroleum Engineers SPE International Symposium on Oilfield Chemistry—Houston, Texas (Feb. 16, 1999)] SPE International Symposium on Oilfield Chemistry—Combining Innovative Technologies To Maximize Scale Squeeze Cost Reduction. SPE 50718.

Sutherland, Louise; Jordan, Myles (). [Society of Petroleum Engineers SPE International Conference on Oilfield Chemistry—Galveston, Texas, USA (Mar. 29, 2019)] SPE International Conference on Oilfield Chemistry—Enhancing Scale Inhibitor Squeeze Retention in HT/HP & High Water Rate Wells—Laboratory to Field Case Study. SPE 193600.

Heath, Stephen Mark; Juliussen, Bjorn; Chen, Ping; Chen, Tao; Benvie, Ronald (). [Society of Petroleum Engineers SPE International Conference on Oilfield Scale—Aberdeen, UK (May 30, 2012)] SPE International Conference on Oilfield Scale—Novel Scale Squeeze Technology and Treatment Designs for Improving Scale Inhibitor Retention and Treatment Lifetimes—Use of Ionic Polymers in the Overflush. SPE 154935.

McRae, J.A.; Heath, S.M.; Strachan, C.; Matthews, L.; Harris, R. (). [Society of Petroleum Engineers SPE International Symposium on Oilfield Scale—Aberdeen, United Kingdom (May 26, 2004)] SPE International Symposium on Oilfield Scale—Development of an Enzyme Activated, Low Temperature, Scale Inhibitor Precipitation Squeeze System. SPE 87441.

Todd, Malcolm John; Lamont, Graeme; Thornton, Alex; Gibb, Angela; Langvik, Magnus; Sjursaether, Karsten (). [Society of Petroleum Engineers Trinidad and Tobago Energy Resources Conference—Port of Spain, Trinidad (Jun. 27, 2010)] Trinidad and Tobago Energy Resources Conference—A New Precipitation Squeeze Alternative for Treating Harsh Barium Sulphate Scaling in a Highly Naturally Fractured North Sea Carbonate Reservoir. SPE 132901.

ChampionX, Scale Squeeze Enhancers, 2012.

Halliburton, Baroid, N-FLOW™ 325, delayed-reaction breaker system, Product Data Sheet, H013513, Mar. 2020.

Halliburton, Baroid, N-FLOW™ 408, delayed-reaction breaker system, Product Data Sheet, H013514, Mar. 2020.

* cited by examiner

ACID PRECURSORS FOR ENHANCED INHIBITOR PLACEMENT IN SCALE SQUEEZE TREATMENTS

BACKGROUND

Scale formation can be problematic in oil and/or gas production wells and surface equipment. Wherever water production occurs, the potential for some type of scale formation exists. Scale formation can also occur in secondary recovery operations where water is injected into the producing formation to drive oil to the producing well. Scale deposits can form on any surface in a downhole operation, including subterranean formations, production tubing, gravel packing screens, and other well bore equipment. Scale can develop almost immediately or build up over several months before becoming noticeable. The effect scale has on production depends on the type, location, and the mass deposited. Scale formation can become so severe as to restrict or even completely choke production. The formation of scale can decrease permeability of the subterranean formation, reduce well productivity, and shorten the lifetime of production equipment. To clean scale from wells and equipment it is generally necessary to stop production, which is both time-consuming and costly.

The formation of scale is often controlled using scale inhibitors. Several methods are known in the art for introducing scale inhibitors into production wells, one of which is a squeeze treatment. In squeeze treatments, a treatment fluid including the scale inhibitor is forced into the producing formation so that the scale inhibitor enters the formation rock and adsorbs thereto. When the producing formation is put back into the production, the produced fluids are treated by the scale inhibitor as it slowly releases from the formation rock. However, many scale inhibitors can be incompatible with brines commonly used in treatment fluids due to undesirable precipitation, potentially causing formation damage. To counteract this effect, the scale inhibitors may be formulated in their acidic forms, thus improving brine compatibility. The acid form of the scale inhibitor may also be desirable, for example, due to improved adsorption/desorption characteristics of the scale inhibitor, allowing deeper placement of the scale inhibitor for enhanced treatment life. However, there are several drawbacks to use of the scale inhibitors in their acid form, including corrosivity concerns, incompatibility with fracturing fluids, and rapid mineral dissolution near wellbore zones (e.g., where strong HCl is in the treatment fluid), thus potentially limiting use of scale inhibitors in brine-based treatment fluids.

BRIEF DESCRIPTION OF THE DRAWINGS

These drawings illustrate certain aspects of some of the embodiments of the present disclosure and should not be used to limit or define the disclosure.

DETAILED DESCRIPTION

Figure 1:
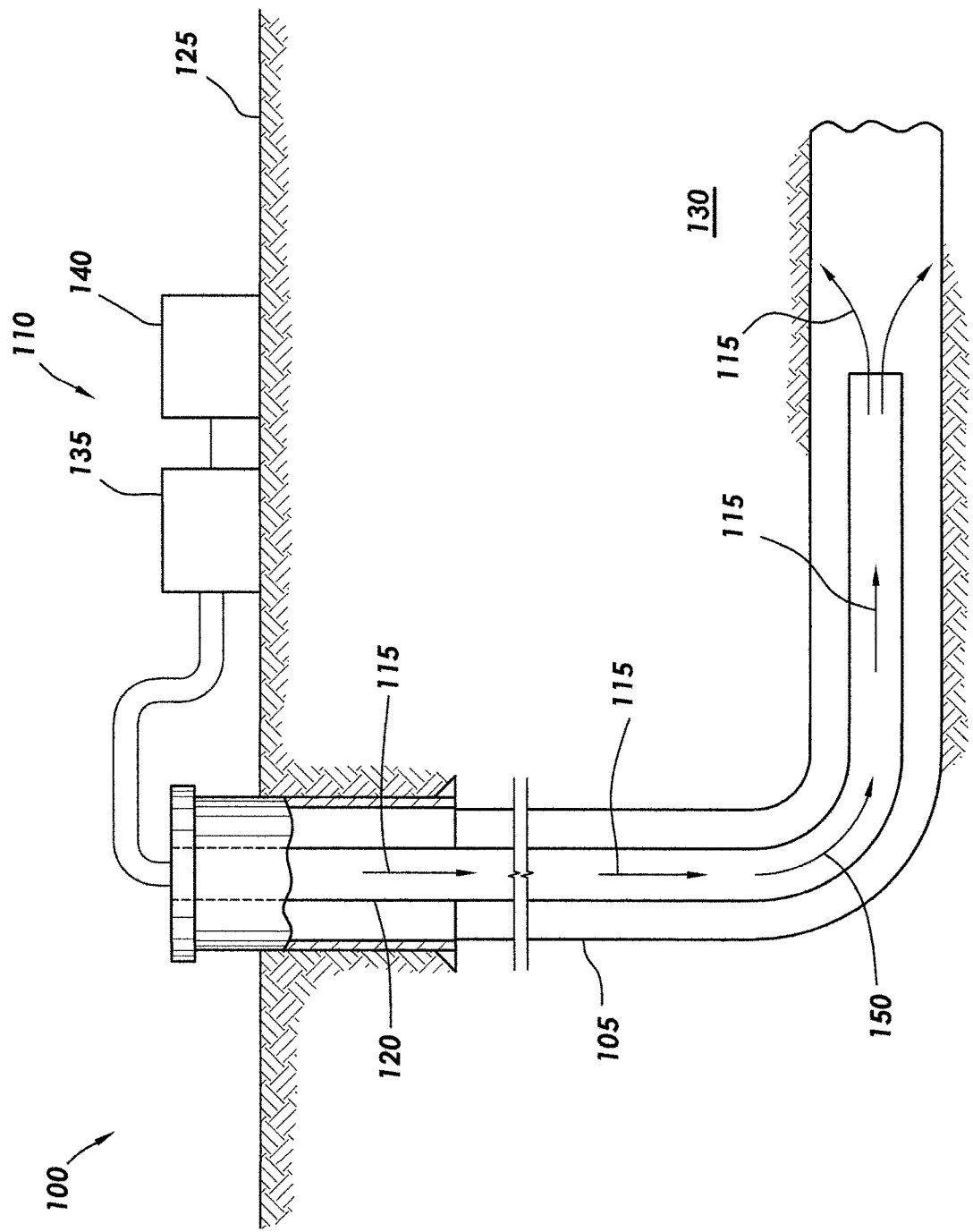
FIG. 1 illustrates a system for introducing a treatment fluid that includes a thermally active acid precursor and a scale inhibitor into a producing formation in accordance with some embodiments of the present disclosure.

Disclosed herein are scale-inhibition treatments and, more particularly, example embodiments relate to use of thermally activated acid precursors in scale-inhibition treatments to enhance placement of scale inhibitors. The thermally activated acid precursor and a scale inhibitor in neutralized form may be introduced into a producing formation in a brine-based treatment fluid, in accordance with example embodiments.

As used herein, the term "neutralized" or "neutral form" in reference to a scale inhibitor having at least one of the acid protons being neutralized by base. In some embodiments, the scale inhibitor may be fully neutralized.

As used herein, the term "producing formation" refers to a reservoir rock formation from which oil, gas, and/or water are produced.

As used herein, the term "scale" refers to an inorganic mineral that forms when the saturation of water to one or more minerals is affected by changing physical conditions (such as temperature, pressure, or composition); thus causing minerals previously in solution to precipitate into solids.

As used herein, the term "thermally activated acid precursor" refers to a material or combination of materials that provides for a delayed release of one or more acidic species over time. The acid precursor is considered "thermally activated" because the acid release is accelerated by increased temperature.

Scale inhibitors are a type of chemical that slows or prevents the formation of scale in water. When introduced into a producing formation, the scale inhibitor should typically adsorb or otherwise attach to formation rock. Over time, the scale inhibitor should slowly release from the rock into fluids in the formation that contain water. In some embodiments, the scale inhibitor may bind to ions in the water-containing fluids, slowing or preventing their precipitation as scale. Thus, improving dosing of the scale inhibitor in the producing formation, including increasing amount adsorbed as well as extending distance into the producing formation can provide for enhanced scale inhibitors. Commonly used scale inhibitors can be provided in acid or neutralized form. In neutralized form, the scale inhibitors may be incompatible with brines used for formulating treatment fluids, thus limiting their use. While the scale inhibitors in acid form can be brine compatible while also having improved placement characteristics, their drawbacks related to corrosivity and near wellbore mineral dissolution can limit their use.

Advantageously, example embodiments combine a scale inhibitor in neutralized form with a thermally activated acid precursor with enhanced inhibitor placement into the producing formation while reducing or potentially eliminating undesirable brine incompatibility. For example, the neutralized scale inhibitor has improved brine compatibility due to inclusion of the thermally activated acid precursor. At initial formulation, partial release of acid from the acid precursor can improve brine compatibility while even better compatibility with potentially full solubility can occur at elevated temperatures. As the brine-based treatment fluid is being pumped into the wellbore and being exposed to downhole temperatures in the wellbore and producing formation, it will gradually heat. The heating will release more acid while the neutralized scale inhibitor is also being converted to its acid form. Advantageously, the acid form of the scale inhibitor has enhanced brine compatibility, rock adsorption, and formation penetration as compared to the neutralized form. However, by use of the neutralized form at the surface, the scale inhibitor may be more easily handled while also reducing the corrosion impact as the conversion to its acidic form is delayed occurred downhole.

Example treatment fluids may include brine, a scale inhibitor in neutralized form, and a thermally activated acid precursor. The treatment fluids may be prepared at the surface and then introduced into a subterranean formation, in accordance with one or more embodiments. Over time and with heat, the thermally activated acid precursor should release acid while the scale inhibitor should convert at least partially to its acid form. In acid form, in some embodiments, the scale inhibitor should react with and adsorb onto formation rock. Additional additives may also be included in the treatment fluids in accordance with present embodiments.

Brines include mixtures of one or more salts dissolved in water. While brines can be saturated, the term brine is used generally herein to reference water containing one or more salts in solution, including seawater or salt waters. Brines typically include more salt than is present in freshwater and can be defined to include dissolved salt in an amount of about 0.1% to about 30% by weight. The brine may include, for example, produced brine, seawater, or another water source, such as freshwater or tap water, with added salt. In some embodiments, the brine can include more salt than typical seawater, for example, more than 35 parts per thousand by weight. Examples of suitable salts in the brines include water-soluble salts, such as sodium chloride, calcium chloride, potassium chloride, potassium carbonate, ammonium chloride, sodium carbonate, potassium carbonate, and combinations thereof. A specific example of a suitable brine may include water with 2% potassium chloride or 6% sodium chloride. The particle salt selected for the brine may be dependent on a number of factors, including cost, availability, and desired density, among others.

Scale inhibitors suitable for use in the treatment fluids described herein in neutralized form may be any of a variety of suitable chemical capable of preventing or reducing scale formation in oilfield operations. In some embodiments, the scale inhibitors may be anionic. Examples of anionic scale inhibitors that may be suitable for use in certain embodiments of the present disclosure include phosphonic acids, phosphoric acids, phosphorous acid, phosphate esters, phosphonates, various aminopolycarboxylic acids, salts thereof, and combinations thereof. Examples of anionic polymeric scale inhibitors that may be suitable for use in certain embodiments of the present disclosure include polyacrylamides, salts of acrylamido-methyl propane sulfonate/acrylic acid copolymer (AMPS/AA), phosphinated maleic copolymer (PHOS/MA) or sodium salt of polymaleic acid/acrylic acid/acrylamido-methyl propane sulfonate terpolymers (PMA/AMPS), salts thereof, and any combinations thereof. An example of a suitable scale inhibitor includes diethylenetriaminepenta (methylene phosphonic acid) (DTPMP) in neutralized form.

The scale inhibitor may be present in the treatment fluid in any suitable amount. For example, the scale inhibitor may be present in an amount of about 1% to about 25% by weight of the treatment fluid. For example, the scale inhibitor may present in an amount of about 1% to about 20% by weight, about 1% to about 15% by weight, about 1% to about 10% by weight, about 1% to about 5% by weight, about 5% to about 25% by weight, about 10% to about 25% by weight, or about 15% to about 25% by weight.

The scale inhibitor may be in neutralized form. As previously described, neutralized form refers to a scale inhibitor having at least one of the acid protons being neutralized by a base, such as ammonia or amines. Thus, the neutralized form are commonly the salts forms of an amine or Na/K/NH$_4$. In some embodiments, the scale inhibitor may be fully neutralized. In some embodiments, the neutralized form may be partially neutralization, for example, a mix of the corresponding acid and partially salt-replaced molecules. The scale inhibitor may be in neutralized form when combined with the other fluid components to form the treatment fluid. Accordingly, the scale inhibitor can be easily stored and handled at the surface since it is in neutralized form while also not having corrosivity problems when pumped through surface equipment and well tubing. However, as the scale inhibitor is exposed to elevated temperatures downhole, it will start to be converted to acidic form, allowing for better brine compatibility, rock adsorption, and formation penetration.

As previously described, scale inhibitors in neutralized form may have compatibility issues with brines. For example, neutralized scale inhibitors may immediately form precipitates at wellhead conditions, thus typically limiting their use in downhole applications, such as squeeze treatments. However, example embodiments include a thermally activated acid precursor in the treatment fluids to provide enhanced brine compatibility for the scale inhibitor in neutralized form.

Acid precursors are materials (or combinations of materials) that that provides for delayed release of one or more acidic species. Such acid precursors may also be referred to as time-delayed and/or time-released acids. The acid precursors are referred to as "thermally activated" because the acid release is accelerated by increased temperature. For example, the acid is released more rapidly at elevated temperatures. The liberation of the acidic species from the acid precursor may be accomplished through any means known to one of ordinary skill in the art with the benefits of this disclosure and compatible with the user-desired applications. In some embodiments, acid precursors may be formed by modifying acids via the addition of an operable functionality component or substituent, physical encapsulation or packaging, or combinations thereof. In accordance with one or more embodiments, the acid precursor may include at least one modified acid (e.g., having an operable functionality, encapsulation, packaging, etc.) such that when acted upon and/or in response to temperature conditions, an acid is released. In an embodiment, the acid precursor may include an acidic species that is released after exposure to an elevated temperature such as an elevated wellbore temperature.

The thermally activated acid precursor may include a reactive ester. The reactive ester may be converted to an acidic species by hydrolysis of the ester linkage, for example by contact with water present in the aqueous fluid of the treatment fluid and/or water present in situ in the wellbore. While the preceding description has described ester linkages, ortho ester linkages are also suitable for the thermally activated acid precursor. Examples of suitable thermally activated acid precursors include lactic acid esters, such as methyl lactate, ethyl lactate, propyl lactate, butyl lactate, or esters of lactic acid and polyols such as glycerol and glycols; formic acid esters that are water soluble or partially soluble, such as ethylene glycol monoformate, ethylene glycol diformate, diethylene glycol diformate, glyceryl monoformate, glyceryl diformate, glyceryl triformate, triethylene glycol diformate; formate esters of pentaerythritol; esters or polyesters of glycerol including, but not limited to, tripropionin (a triester of propionic acid and glycerol), trilactin; esters of acetic acid and ethylene glycol, polyethylene glycol, glycerol, polyglycerols, polyols, such as ethylene glycol monoacetate, ethylene glycol diacetate, monoacetin, diacetin, and triacetin; esters of glycolic acid, such as ethyl or methyl or propyl or butyl glycolate, or esters of glycolic acid and polyols such as glycerol and glycols; methyl or ethyl esters of dicarboxylic acids, such as dimethyl maleate, dimethyl fumarate, dimethyl succinate, diethyl maleate, diethyl fumarate, diethyl succinate; aliphatic polyesters; lactones such as butyrolactone; poly(lactides); poly(glycolides); poly($\varepsilon$-caprolactones); poly(hydroxybutyrates); poly(anhydrides); aliphatic polycarbonates; poly(amino acids); and polyphosphazenes; or copolymers thereof; poly(ortho esters); orthoesters (which may also be known as "poly ortho ethers" or "ortho ethers"); esters of oxalic acid; esters of propionic acid; esters of butyric acid; esters of monochloroacetic acid; esters of dichloroacetic acid; esters of trichloroacetic acid; derivatives thereof; or combinations thereof. Other examples of suitable acid precursors include halide esters and esters of acids such as esters of nitric acid, sulphuric acid, sulphonic acid, sulphonic acid, phosphoric acid, phosphorous acid, phosphonic acid, phosphinic acid, sulphamic acid and the like. In some embodiments, the thermally activated acid precursor may include diethylene glycol diformate, diethylene glycol monoformate, monoethylene glycol monoformate, monoethylene glycol diformate, ethyl lactate, methyl lactate, n-propyl lactate, isopropyl lactate, trimethyl orthoformate, triethyl orthoformate, trimethyl orthoacetate, triethyl orthoacetate, tri-n-propyl orthoformate, tri-n-butyl orthoformate, or combinations thereof. The particulate thermally activated acid precursor selected for use may depend on a variety of factors including which liberation of the acidic species is desired relative to the placement of the treatment fluid in the producing formation; the environmental conditions presented; the conditions within the wellbore; the temperature of the wellbore and producing formation in which the treatment fluid s being placed; the composition of the formation water, etc. Other considerations may be evident to those skilled in the art with the benefits of this disclosure.

The thermally activated acid precursor may be in any suitable amount, including from about 5% to about 25% by weight of the treatment fluid. In some embodiments, the thermally activated acid precursory may be present in an amount of about 5% to about 20%, about 5% to about 15%, about 5% to about 10%, about 10% to about 25%, about 15% to about 25%, about 20% toa bout 25%, about 15% to about 25%, or about 20% to about 25% by weight of the treatment fluid. Factors that may be considered in deciding how much of the thermally activated acid precursor to use include the composition of the formation, the temperature of the formation, the pressure of the formation, the diameter of the hole, the particular fines and damage present in the formation (e.g., scale, skin, calcium carbonate, silicates, and the like), and the particular acid precursor used, among others. Mutual solvents can also be used to improve the solubility of thermally activated acid precursor in water. Examples of mutual solvents includes alcohols, such as methanol, ethanol, n-propanol, isopropanol, n-butanol; glycols, glycerol, and polyols, such as ethylene glycol, diethylene glycol, triethylene glycol, propylene glycol, dipropylene glycol, polyglycerol; ethers of glycols and polyols, such as ethylene glycol dimethyl ether, ethylene glycol monobutyl ether, diethylene glycol monobutyl ether; other water-soluble organic solvents, such as 2-pyrrolidone, N-methyl-2-pyrrolidone.

One or more additional additives may be included in the treatment fluid for a particular as desired by those of ordinary skill in the art. Examples of suitable additives include surfactants, corrosion inhibitors, chelating agents, biocides, foam control agents, oxygen scavenger, clay stabilizers, mutual solvents, and combinations thereof.

The components of the treatment fluid may be combined in any suitable manner to prepare the treatment fluid. Any of a variety of suitable mixing devices may be used for combining the treatment fluid components. In some embodiments, the components of the treatment fluid are combined at the well site. Combining of the thermally activated acid precursor with the brine may initiate hydrolysis, for example, via hydrolysis and disassociation of the ester groups present in the acid precursor in accordance with one or more embodiments. Release of the acid should aid in compatibility of the scale inhibitor in neutralized form with the brine. The release of the acid should accelerate as downhole temperatures are encountered after introduction of the treatment fluid into the wellbore. However, the treatment fluid may be designed to release the acid slowly, in situ within the wellbore and/or producing formation after placement. Thus, the pH of the treatment fluid may not be as low at the time of placement (e.g., pumping downhole) than would be the case if the acidic species were added directly to the treatment fluid. This may help to product surface equipment and wellbore tubulars from corrosion. In addition, the scale inhibitor may start to convert to its acidic form after combination with the brine. This conversion may continue in the wellbore and producing formation, after placement. In the acid form, the scale inhibitor may have better adsorption characteristics and also deeper placement into the producing formation.

In some embodiments, a method of scale inhibition includes introducing a treatment fluid into a producing formation to control scaling in and around the producing formation, wherein the treatment fluid includes a brine, a scale inhibitor in neutralized form, and a thermally activated acid precursor. The treatment fluid may be introduced through a production wellbore or an injection wellbore, for example. Introduction in the producing formation may be considered a squeeze treatment, wherein the treatment fluid may be forced into the producing rock below fracture pressures. In a squeeze treatment, the production may be stopped from the production wellbore for treatment while the treatment fluid is introduced into the producing formation. The wellbore may then be shut in to allow the scale inhibitor to interact with the formation rock such that the scale inhibitor attaches to formation rock. After the shut-in period, the wellbore may be put back into production with the scale inhibitor slowly releasing from the formation rock into produced fluids. The squeeze treatment may be repeated when scale inhibitor levels in the produced fluids fall below a desirable level.

In some embodiments, a squeeze treatment may include multiple stages. First, example embodiments may include a pre-flush stage to prepare the producing formation for the scale inhibitor. Next, example embodiments may include a scale-inhibitor stage to introduce the scale inhibitor into the producing formation. After the scale-inhibitor stage, example embodiments may include an over-flush stage to push the scale inhibitor further into the producing formation. Example embodiments may follow this scale-inhibitor stage with a shut-in stage to allow interaction of the scale inhibitor with formation rock after the producing formation may be put back into production in a back-production stage.

In some embodiments, the squeeze treatment may include a pre-flush stage. In the pre-flush stage, a pre-flush may be introduced into the producing formation to prepare it for the scale inhibitor. The pre-flush may include a smaller amount of the scale inhibitor in brine, which or may not be in neutralized form. The scale inhibitor may typically be the same scale inhibitor used in the scale-inhibitor stage, for example. In some embodiments, the scale inhibitor may be included in the pre-flush in an amount of about 1000 parts per million to about 1% by weight of the pre-flush. A water clarifier and/or clay stabilizer may also be included in the pre-flush. An example of a suitable water clarifier and/or clay stabilizer includes choline chloride. Among other things, the pre-flush may cool the producing formation, thus reducing near wellbore adsorption so that the scale inhibitor in the next stage may propagate further into the producing formation. In addition, the pre-flush may displace formation water, thereby creating a buffer zone, to avoid any incompatibilities with the high concentrations of the scale inhibitor injected in the next stage, especially when high salinity/high calcium ion formation waters are involved. The pre-flush may also remove residual surface oil to increase water wetness.

After the pre-flush stage, example embodiments may include a scale-inhibitor stage in which a treatment fluid as described herein may be introduced into the producing formation. As previously described, the scale inhibitor may be included in the treatment fluid in a neutralized form. The treatment fluid as described herein may further include a thermally activated acid precursor and brine.

To push the scale inhibitor further into the producing formation, examples embodiments next include an over-flush stage. In the over-flush stage, an over-flush may be introduced into the producing formation behind the treatment fluid. The over-flush may also include the scale inhibitor in a brine at lower concentrations, which may or may not be in neutralized form. The scale inhibitor may typically be the same scale inhibitor used in the scale-inhibitor stage, for example. In some embodiments, the scale inhibitor may be included in the over-flush in an amount of about 1000 parts per million to about 1% by weight of the pre-flush. Additional additives may be included in the over-flush, including clay stabilizers, water clarifiers, biocides, foaming agents, mutual solvents, and combinations thereof. Examples of suitable water clarifiers and/or clay stabilizers include choline chloride. In some embodiments, the over-flush may be the majority of the fluid volume introduced into the producing formation in the squeeze treatment. In some embodiments, the over-flush may be designed to push the scale inhibitor further into the producing formation, for example, a radial distance of from about 8 feet to about 15 feet from the producing or injection wellbore in which the fluids were introduced. This should increase the surface area of formation rock exposed to the scale inhibitor, thus increasing adsorption level. In addition, the scale inhibitor may be pushed from cooled near wellbore regions into hotter portions of the producing formation where greater adsorption may take place.

In the shut-in stage, the producing formation may be shut-in for some period of time after the over-flush stage. The shut-in may be shut-in, for example, to allow interaction of the scale inhibitor with formation rock with adsorption of the scale inhibitor to the formation rock. Shut-in times can vary depending, for example, on a particular time for inhibitor adsorption to reach equilibrium but can vary from 1 hour to 24 hours or from 6 hours to 12 hours. At higher temperatures, shorter shut-in periods may be needed as adsorption rates can be higher.

After the shut-in stage, a production stage may place the producing formation back into production. In some embodiments, production may be recommenced in the original direction of flow. The scale inhibitor may be slowly released from formation rock and return to the surface in the produced fluids.

Turning now to FIG. 1, an example well system 100 for introduction of treatment fluids described herein into a wellbore 105 is shown. In accordance with present embodiments, the wellbore 105 may be producing or injection wellbore. As depicted in FIG. 1, the system 100 may include a fluid handling system 110 for introducing a treatment fluid 115 into the wellbore 105 by way of a tubular 120. The treatment fluid 115 as described herein may include a brine, a scale inhibitor in neutralized form, and a thermally activated acid precursor. In the illustrated embodiment, the fluid handling system 110 is above surface 125 while the wellbore 105 and the tubular 120 are below the surface 125. The fluid handling system 110 can be configured as shown in FIG. 1 or in a different manner and may include additional or different features as appropriate. The fluid handling system 110 may be deployed via skid equipment, marine vessel deployed, or may be included of sub-sea deployed equipment.

As illustrated in FIG. 1, the wellbore 105 may include vertical and horizontal sections, and the treatment fluid 115 may be introduced into a producing formation 130 surrounding the horizontal portion of the wellbore 105. Generally, a wellbore 105 may include horizontal, vertical, slant, curved, and other types of wellbore geometries and orientations, and the treatment fluid 115 may generally be applied to the producing formation 130 surrounding any portion of the wellbore 105. The wellbore 105 may include a casing (not shown) that is cemented or otherwise secured to the wellbore wall. The wellbore 105 can be uncased or include uncased sections. Perforations can be formed in the casing to allow treatment fluids and/or other materials to flow into the producing formation 130. Perforations can be formed using shape charges, a perforating gun, and/or other tools.

The fluid handling system 110 may include mobile vehicles, immobile installations, skids, hoses, tubes, fluid tanks or reservoirs, pumps, valves, and/or other suitable structures and equipment. For example, the fluid handling system 110 may include pumping equipment 135 and a fluid supply 140, which both may be in fluid communication with the tubular 120. The fluid supply 140 may contain the treatment fluid 115. The pumping equipment 135 may be used to supply the treatment fluid 115 from the fluid supply 140, which may include tank, reservoir, connections to external fluid supplies, and/or other suitable structures and equipment. The pumping equipment 135 may be coupled to the tubular 120 to communicate the treatment fluid 115 into the wellbore 105. The fluid handling system 110 may also include surface and downhole sensors (not shown) to measure pressure, rate, temperature and/or other parameters of treatment. The fluid handling system 110 may include pump controls and/or other types of controls for starting, stopping and/or otherwise controlling pumping as well as controls for selecting and/or otherwise controlling fluids pumped during the injection treatment. An injection control system may communicate with such equipment to monitor and control the injection treatment.

The tubular 120 may include coiled tubing, sectioned pipe, and/or other structures that communicate fluid through wellbore 105. Alternatively, the tubular 120 may include casing, liners, or other tubular structures disposed in the wellbore 105. The tubular 120 may include flow control devices, bypass valves, ports, and or other tools or well devices that control a flow of fluid from the interior of the tubular 120 into the producing formation 130. For example, the tubular 120 may include ports to communicate the treatment fluid 115 directly into the rock matrix of the producing formation 130.

With continued reference to FIG. 1, the well system 100 may be used for delivery of the treatment fluid 115 into wellbore 105. The treatment fluid 115 may be pumped from the fluid supply 140 down the interior of the tubular 120 in the wellbore 105. The treatment fluid 115 may be allowed to flow down the interior of the tubular 120, exit the tubular 120, and finally enter the producing formation 130. In the producing formation 130, the scale inhibitor in the treatment fluid 115 interacts with formation rock, for example, to adsorb thereon for later release into produced fluids. As discussed above, while not shown, additional treatment stages may include a pre-flush stage, an over-flush stage, a shut-in stage, and a production stage.

Figure 2:
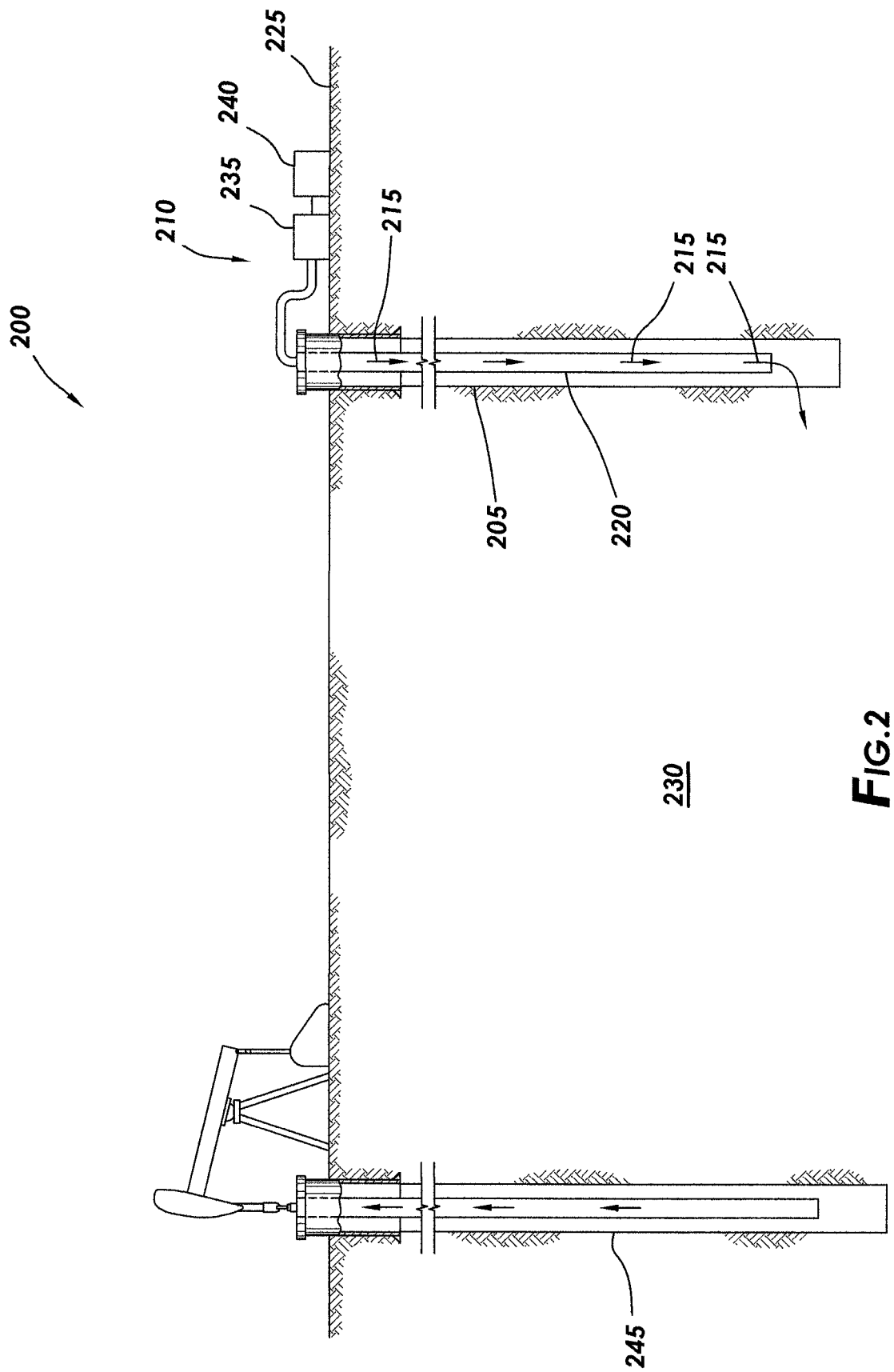
FIG. 2 illustrates a system for introducing a treatment fluid that includes a thermally active acid precursor and a scale inhibitor into a producing formation by way of an injection well in accordance with some embodiments of the present disclosure.

Turning now to FIG. 2, an example well system 200 for introduction of treatment fluids into an injection wellbore 205 described is shown. In the illustrated embodiment, the well system 200 may include a fluid handling system 210 for introducing a treatment fluid 215 into the injection wellbore 205 by way of a tubular 220. The treatment fluid 215 as described herein may include a brine, a scale inhibitor in neutralized form, and a thermally activated acid precursor. In the illustrated embodiment, the fluid handling system 210 is above surface 225 while the injection wellbore 205 and the tubular 220 are below the surface 225. The fluid handling system 210 can be configured as shown in FIG. 2 or in a different manner and may include additional or different features as appropriate. The fluid handling system 210 may be deployed via skid equipment, marine vessel deployed, or may be included of sub-sea deployed equipment.

As illustrated in FIG. 2, the injection wellbore 205 may include a vertical section and the treatment fluid 215 may be introduced into a producing formation 230 by way of the injection wellbore 205. As illustrated, a production wellbore 245 may also penetrate the producing formation 230. During production, for example, water may be injected into the producing formation 230 by way of the injection wellbore 205 to drive oil or other produced fluids from the producing formation 230 into the production wellbore 245. While FIG. 2 generally illustrates injection wellbore 205 and production wellbore 245 as being vertical, these wellbores may also include horizontal, slant, curved, and other types of wellbore geometries and orientations. The injection wellbore 205 may include a casing (not shown) that is cemented or otherwise secured to the wellbore wall. The injection wellbore 205 can be uncased or include uncased sections. Perforations can be formed in the casing to allow treatment fluids and/or other materials to flow into the producing formation 230. Perforations can be formed using shape charges, a perforating gun, and/or other tools.

The fluid handling system 210 may include mobile vehicles, immobile installations, skids, hoses, tubes, fluid tanks or reservoirs, pumps, valves, and/or other suitable structures and equipment. For example, the fluid handling system 210 may include pumping equipment 235 and a fluid supply 240, which both may be in fluid communication with the tubular 330. The fluid supply 240 may contain the treatment fluid 215. The pumping equipment 235 may be used to supply the treatment fluid 215 from the fluid supply 240, which may include tank, reservoir, connections to external fluid supplies, and/or other suitable structures and equipment. The pumping equipment 235 may be coupled to the tubular 220 to communicate the treatment fluid 22 into the injection wellbore 205. The fluid handling system 210 may also include surface and downhole sensors (not shown) to measure pressure, rate, temperature and/or other parameters of treatment. The fluid handling system 210 may include pump controls and/or other types of controls for starting, stopping and/or otherwise controlling pumping as well as controls for selecting and/or otherwise controlling fluids pumped during the injection treatment. An injection control system may communicate with such equipment to monitor and control the injection treatment.

The tubular 220 may include coiled tubing, sectioned pipe, and/or other structures that communicate fluid through the injection wellbore 205. Alternatively, the tubular 220 may include casing, liners, or other tubular structures disposed in the injection wellbore 205. The tubular 220 may include flow control devices, bypass valves, ports, and or other tools or well devices that control a flow of fluid from the interior of the tubular 220 into the producing formation 230. For example, the tubular 220 may include ports to communicate the treatment fluid 215 directly into the rock matrix of the producing formation 230.

With continued reference to FIG. 2, the well system 200 may be used for delivery of the treatment fluid 215 into injection wellbore 205. The treatment fluid 215 may be pumped from the fluid supply 240 down the interior of the tubular 220 in the injection wellbore 205. The treatment fluid 215 may be allowed to flow down the interior of the tubular 220, exit the tubular 220, and finally enter the producing formation 230. In the producing formation 230, the scale inhibitor in the treatment fluid 215 interacts with formation rock, for example, to adsorb thereon for later release into produced fluids. Produced fluids containing the scale inhibitor may be recovered, for example, by way of the production wellbore 245. As discussed above, while not shown, additional treatment stages may include a pre-flush stage, an over-flush stage, a shut-in stage, and a production stage.

Accordingly, the present disclosure may provide thermally activated acid precursors for use in scale-inhibition treatments. The methods, systems, and compositions may include any of the various features disclosed herein, including one or more of the following statements.

Statement 1. A method of scale inhibition comprising: introducing a treatment fluid comprising a brine, a scale inhibitor in neutralized form, and a thermally activated acid precursor through a wellbore and into a producing formation; wherein the thermally activated acid precursor is heated to release an acid that enhances miscibility of the scale inhibitor in the brine.

Statement 2. The method of Statement 1, wherein the introducing the treatment fluid comprises pumping the treatment fluid through production tubing.

Statement 3. The method of Statement 1, wherein the wellbore is an injection wellbore, and wherein the treatment fluid is introduced into the producing formation and at least a portion of the treatment fluid travels toward a production wellbore in the producing formation.

Statement 4. The method of any preceding Statement, wherein at least a portion of the scale inhibitor converts to acid form in the producing formation.

Statement 5. The method of Statement 4, wherein at least a portion of the scale inhibitor in the acid form adsorbs onto formation rock in the producing formation.

Statement 6. The method of any preceding, wherein the scale inhibitor comprises at least one anionic scale inhibitor selected from the group consisting of phosphonic acid, phosphonic acid, phosphoric acid, phosphoric acid, phosphorous acid, phosphorous acid, phosphate ester, phosphonate, an aminopolycarboxylic acid, polyacrylamide, acrylamido-methyl propane sulfonate/acrylic acid copolymer, phosphinated maleic copolymer, polymaleic acid/acrylic acid/acrylamido-methyl propane sulfonate terpolymers. diethylenetriaminepenta (methylene phosphonic acid), and combinations thereof.

Statement 7. The method of any preceding Statement, wherein the thermally activated acid precursor comprises at least one of an ester linkage or an ortho ester linkage.

Statement 8. The method of any preceding Statement, wherein the thermally activated acid precursor comprises at least one ester or orthoester selected from the group consisting of a lactic acid ester, a formic acid ester, a acetic acid ester, an ester of glycerol, a polyester of glycerol, an ester of a glycol or a polyol, a polyester of a glycol or a polyol, an ester of glycolic acid, an ester of glycolic acid and a polyol, a lactone, a methyl or ethyl ester of a dicarboxylic acid, an aliphatic polyester, poly(ortho ester), poly(lactide), poly (glycolide), poly($\varepsilon$-caprolactone), poly(hydroxybutyrate), poly(anhydride), aliphatic polycarbonates, poly(amino acid), an orthoester, an ester of oxalic acid, an ester of propionic acid, an ester of butyric acid, an ester of monochloroacetic acid, an ester of dichloroacetic acid, an ester of trichloroacetic acid, a sulfonic acid ester, and combinations thereof.

Statement 9. The method of any preceding Statement, wherein the thermally activated acid precursor comprises at least one formate or orthoformate selected from the group consisting of diethylene glycol diformate, diethylene glycol monoformate, monoethylene glycol monoformate, monoethylene glycol diformate, trimethyl orthoformate, triethyl orthoformate, tri-n-propyl orthoformate, tri-n-butyl orthoformate, and combinations thereof.

Statement 10. The method of any preceding Statement, wherein the scale inhibitor comprises a salt of diethylenetriaminepenta (methylene phosphonic acid), and wherein the thermally activated acid precursor comprises diethylene glycol diformate.

Statement 11. The method of any preceding Statement, wherein the thermally activated acid precursor hydrolyzes to release the acid.

Statement 12. The method of any preceding Statement, further introducing a pre-flush into the producing formation prior to the treatment fluid, wherein the pre-flush comprises the scale inhibitor in a concentration less than the treatment fluid.

Statement 13. The method of any preceding Statement, further comprising introducing an over-flush into the producing formation after the treatment fluid to push the scale inhibitor further into the producing formation.

Statement 14. The method of Statement 13, further comprising shutting in the producing formation after the over-flush.

Statement 15. A method of scale inhibition comprising: introducing a pre-flush into a producing formation; introducing a treatment fluid comprising a brine, a scale inhibitor in neutralized form, and a thermally activated acid precursor into the producing formation; and introducing an over-flush into the producing formation to push the scale inhibitor further into the producing formation.

Statement 16. The method of Statement 15, further comprising shutting in the producing formation after the over-flush and then resuming production from the producing formation after the shutting in the producing formation.

Statement 17. The method of any one of Statement 15 or Statement 16, wherein the pre-flush comprises the scale inhibitor in a concentration less than the treatment fluid.

Statement 18. The method of any one of Statements 15 to 17, wherein the thermally activated acid precursor is heated to release an acid by way of hydrolysis that enhances miscibility of the scale inhibitor in the brine.

Statement 19. The method of any one of Statements 15 to 18, wherein the thermally activated acid precursor comprises at least one of an ester linkage or an ortho ester linkage.

Statement 20. The method of any one of Statements 15 to 19, wherein the thermally activated acid precursor comprises at least one formate or orthoformate selected from the group consisting of diethylene glycol diformate, diethylene glycol monoformate, monoethylene glycol monoformate, monoethylene glycol diformate, trimethyl orthoformate, triethyl orthoformate, tri-n-propyl orthoformate, tri-n-butyl orthoformate, and combinations thereof.

To facilitate a better understanding of the present invention, the following examples of certain aspects of some embodiments are given. In no way should the following examples be read to limit, or define, the entire scope of the disclosure.

Example 1

This example is provided to illustrate brine compatibility of scale inhibitors in acidic form versus the corresponding neutralized form. Sample Fluid No. 1 was prepared by combining DTPMP (acid form) in a moderate total dissolved solid (TDS) brine at room temperature in an amount of 5% by weight of the brine. Sample Fluid No. 2 was prepared by combining DTPMP (neutralized form) in the same brine at room temperature in an amount of 5% by weight of the brine. The brine composition for this example is set forth in the table below:

TABLE 1

| Species | Unit | Value |
| --- | --- | --- |
| $Na^+$ | mg/L | 12,000 |
| $K^+$ | mg/L | 100 |
| $Mg^{2+}$ | mg/L | 50 |
| $Ca^{2+}$ | mg/L | 1000 |
| $Sr^{2+}$ | mg/L | 22 |
| $Ba^{2+}$ | mg/L | 50 |
| $Fe^{2+}$ | mg/L | ND |
| Cl- | mg/L | 20,000 |
| $SO_4^{2+}$ | mg/L | ND |
| $HCO_3^-$ | Mg/L | 300 |
| $CO_2$ | % in gas | 2 |

After preparation, the sample fluids were then observed to determine brine compatibility. Sample Fluid No. 1 with the DTPMP in acidic form remained clear indicating dissolution of the DTPMP into the brine. However, Sample Fluid No. 2 with the DTPMP in neutralized form immediately formed precipitation indicating incompatibility of the neutralized form with the brine.

Example 2

This example is provided to illustrate improved brine compatibility of scale inhibitors in neutralized form from use of a thermally activated acid precursor. The scale inhibitor tested was DTPMP. The thermally activated acid precursor tested was diethylene glycol diformate. Six test fluids were prepared at room temperature by combining varying amounts of diethylene glycol diformate with a moderate TDS brine (from Example 1 above) and DTPMP (neutralized form) in an amount of 1% by weight of the brine. Test Fluid No. 3 was a control that include the DTPMP in acidic form. Test Fluid No. 4 was a control that did not include the diethylene glycol diformate (acid precursor). The brine was preheated to 90° C. and each test fluid was observed at initial conditions, 30 minutes, and 60 minutes to evaluate brine compatibility.

The results of the test are provided in the table below:

TABLE 2

| Test Fluid | Acidic DTPMP- (% by wt) | Neutralized DTPMP (% by wt) | Ester Acid Precursor (% by wt) | Temperature (° C.) | T = 0 min | T = 30 min | T = 60 min |
|---|---|---|---|---|---|---|---|
| No. 3 (control) | 1 | 0 | 0 | 90 | Clear | Clear | Clear |
| No. 4 (control) | 0 | 1 | 0 | 90 | Cloudy | Cloudy | Cloudy |
| No. 5 | 0 | 1 | 2 | 90 | Cloudy | Clear | Clear |
| No. 6 | 0 | 1 | 4 | 90 | Cloudy | Clear | Clear |
| No. 7 | 0 | 1 | 6 | 90 | Clear | Clear | Clear |
| No. 8 | 0 | 1 | 8 | 90 | Clear | Clear | Clear |
| No. 9 | 0 | 1 | 10 | 90 | Clear | Clear | Clear |

As illustrated in Table 2, the inclusion of the diethylene glycol diformate with the DTPMP (neutralized) in the brine increased brine compatibility. In Sample Fluid No. 3 (control), the DTPMP in acidic form remained soluble in the brine whereas Sample Fluid No. 4 (control) with the DTPMP in neutralized formed was incompatible at all test times as evidence by significant precipitation. For Sample Fluids No. 5 to No. 9 that included the diethylene glycol diformate with the DTPMP (neutralized), brine compatibility was observed if the diethylene glycol diformate was dosed at higher levels (6% by weight or greater) due to partial release of the acid. However, full solubility was observed for the DTPMP (neutralized) in combination with the diethylene glycol diformate even for Sample Fluid No. 5 with the diethylene glycol diformate at 2% by weight after heating for 30 minutes or longer indicating the brine compatibility increases as more acid is released into the brine.

Example 3

This example was performed to illustrate reaction of the scale inhibitor with the formation rock. The formation rock was simulated with calcite. The scale inhibitor used was DTPMP. Sample Fluid No. 10 was a control that included DTPMP (acidic) in a moderate TDS brine (from Example 1 above) in an amount of 1% by weight of the brine. Sample Fluid No. 11 include DTPMP (neutralized) in a same brine in an amount of 1% by weight of the brine. Sample Fluid No. 11 further included diethylene glycol diformate in an amount of 5% by weight of the brine. The brine was preheated to 90° C.

After squeezing into the formation, the acidic ingredients and the scale inhibitor itself should react with the formation rock usually causing haze of gel-like precipitation. Once formed, this precipitated scale inhibitor is believed to adsorb or otherwise attach to the formation rock and then desorb when the well starts to produce water. Accordingly, the later precipitation is formed should result in deeper penetration of the scale inhibitor into the formation. In this example, calcite was used to simulate formation rock. The calcite was first added to each of Sample Fluid Nos. 10 and 11 in an amount of 10 milligrams per 10 milliliters. In Sample Fluid No. 10 with the DTPMP (acidic), precipitation was formed in about 5 minutes with 10 milligrams of calcite. However, no precipitation was observed in Sample Fluid No. 11 that included the DTPMP (neutralized) and diethylene glycol diformate. The calcite was then added to each of Sample Fluid Nos. 10 and 11 in an amount of 100 milligrams per 10 milliliters. In Sample Fluid No. 10 with the DTPMP (acidic), precipitation was again formed with 100 milligrams of calcite. In this test, precipitation was also immediately formed in Sample Fluid No. 11 that included the DTPMP (neutralized) and diethylene glycol diformate, indicating potentially deeper formation penetration and better placement.

Example 4

This example was performed to illustrate quantitative enhancement for deeper placement of a scale inhibitor in squeeze treatments. A simulation was performed to determine the quantitative improvement factor if the scale inhibitor can be placed 1 foot deeper into the formation. Using the same chemical consumption, the scale inhibitor was push from 8 feet from 9 feet from the wellbore. In this example, the minimum effective concentration (MEC) of the scale inhibitor is defined as 5 ppm.

Figure 3:
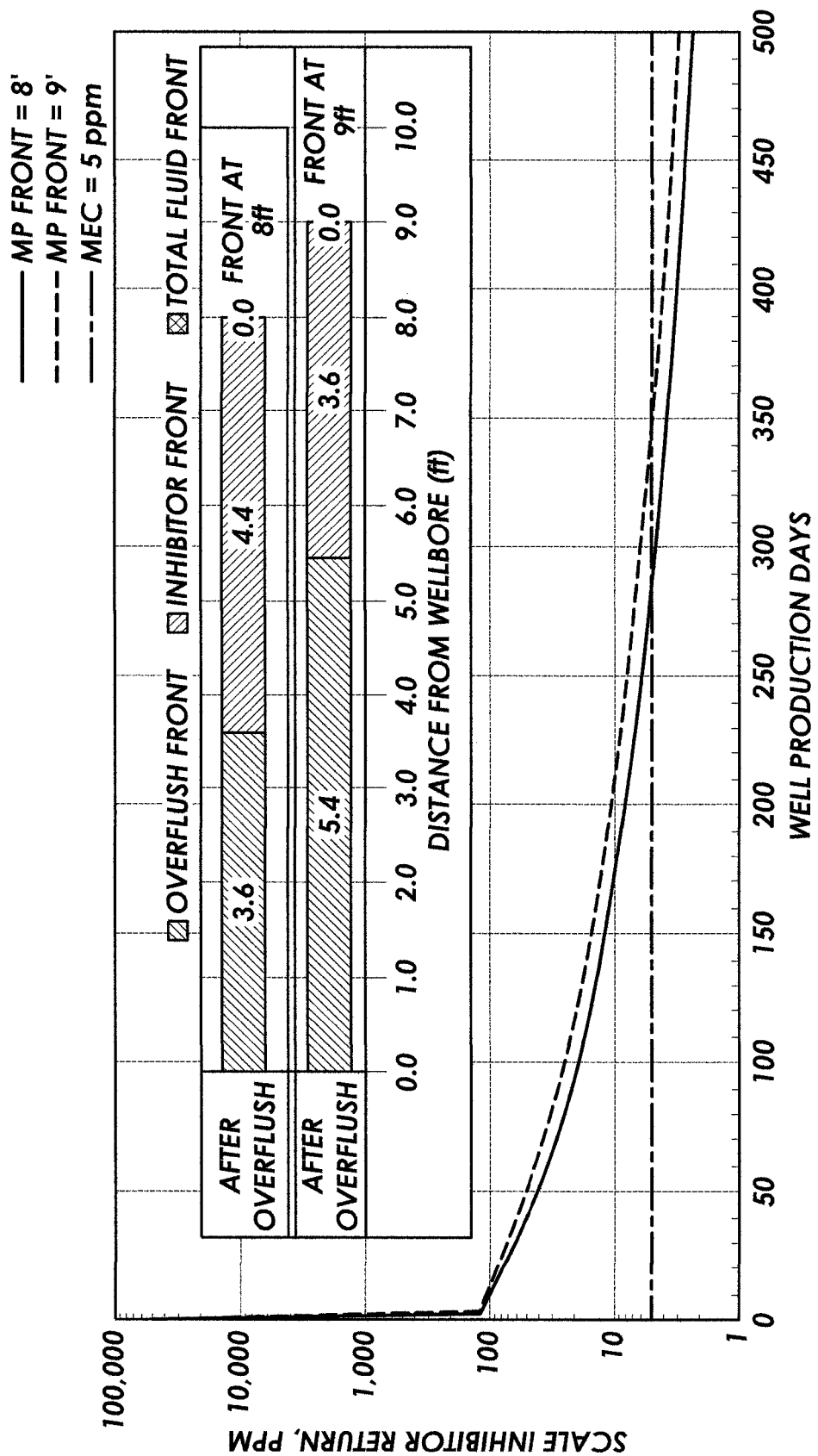
FIG. 3 is a graph of a model simulation showing improvement from introducing a scale inhibitor further into the producing formation in accordance with some embodiments of the present disclosure.

The results of this simulation are provided on FIG. 3. As illustrated, time before the scale inhibitor turn reaches MEC was extended from 270 days to 340 days be placement of the scale inhibitor 1 foot deeper into the formation. This results in greater than 25% more life for the scale inhibitor.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present embodiments are well adapted to attain the ends and advantages mentioned as well as those that are inherent therein. The particular embodiments disclosed above are illustrative only, as the present embodiments may be modified and practiced in different but equivalent manners apparent to those skilled in the art having the benefit of the teachings herein. Although individual embodiments are discussed, all combinations of each embodiment are contemplated and covered by the disclosure. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present disclosure.

What is claimed is:

1. A method of scale inhibition comprising:
preparing a treatment fluid comprising a brine, an anionic scale inhibitor in neutralized form, and a thermally activated acid precursor, wherein the scale inhibitor is a dissolved solute in the treatment fluid, and wherein the thermally activated acid precursor comprises at least one of an ester linkage or an orthoester linkage; and
introducing the treatment fluid through a wellbore and into a producing formation;
wherein the thermally activated acid precursor is heated to release an acid that enhances miscibility of the scale inhibitor in the brine.

2. The method of claim 1, wherein the introducing the treatment fluid comprises pumping the treatment fluid through production tubing.

3. The method of claim 1, wherein the wellbore is an injection wellbore, and wherein the treatment fluid is introduced into the producing formation and at least a portion of the treatment fluid travels toward a production wellbore in the producing formation.

4. The method of claim 1, wherein at least a portion of the scale inhibitor converts to acid form in the producing formation.

5. The method of claim 4, wherein at least a portion of the scale inhibitor in the acid form adsorbs onto formation rock in the producing formation.

6. The method of claim 1, wherein the anionic scale inhibitor comprises at least one anionic scale inhibitor selected from the group consisting of phosphonic acid, phosphoric acid, phosphorous acid, phosphate ester, phosphonate, an aminopolycarboxylic acid, polyacrylamide, acrylamido-methyl propane sulfonate/acrylic acid copolymer, phosphinated maleic copolymer, polymaleic acid/acrylic acid/acrylamido-methyl propane sulfonate terpolymers. diethylenetriaminepenta (methylene phosphonic acid), and combinations thereof.

7. The method of claim 1, wherein the thermally activated acid precursor comprises at least one ester or orthoester selected from the group consisting of a lactic acid ester, a formic acid ester, a acetic acid ester, an ester of glycerol, a polyester of glycerol, an ester of a glycol or a polyol, a polyester of a glycol or a polyol, an ester of glycolic acid, an ester of glycolic acid and a polyol, a lactone, a methyl or ethyl ester of a dicarboxylic acid, an aliphatic polyester, poly(ortho ester), poly(lactide), poly(glycolide), poly(ε-caprolactone), poly(hydroxybutyrate), poly(anhydride), aliphatic polycarbonates, poly(amino acid), an orthoester, an ester of oxalic acid, an ester of propionic acid, an ester of butyric acid, an ester of monochloroacetic acid, an ester of dichloroacetic acid, an ester of trichloroacetic acid, a sulfonic acid ester, and combinations thereof.

8. The method of claim 1, wherein the thermally activated acid precursor comprises at least one formate or orthoformate selected from the group consisting of diethylene glycol diformate, diethylene glycol monoformate, monoethylene glycol monoformate, monoethylene glycol diformate, trimethyl orthoformate, triethyl orthoformate, tri-n-propyl orthoformate, tri-n-butyl orthoformate, and combinations thereof.

9. The method of claim 1, wherein the scale inhibitor comprises a salt of diethylenetriaminepenta (methylene phosphonic acid), and wherein the thermally activated acid precursor comprises diethylene glycol diformate.

10. The method of claim 1, wherein the thermally activated acid precursor hydrolyzes to release the acid.

11. The method of claim 1, further introducing a pre-flush into the producing formation prior to the treatment fluid, wherein the pre-flush comprises the scale inhibitor in a concentration less than the treatment fluid.

12. The method of claim 1, further comprising introducing an over-flush into the producing formation after the treatment fluid to push the scale inhibitor further into the producing formation.

13. The method of claim 12, further comprising shutting in the producing formation after the over-flush.

14. The method of claim 1, wherein the acid precursor comprises diethylene glycol diformate present in the treatment fluid in an amount of at least 6% by weight of the treatment fluid, and wherein the neutralized anionic scale inhibitor comprises DTPMP in an amount of about 1% by weight of the treatment fluid.

15. A method of scale inhibition comprising:
introducing a pre-flush into a producing formation;
preparing a treatment fluid comprising a brine, an anionic scale inhibitor in neutralized form, and a thermally activated acid precursor, wherein the scale inhibitor is a dissolved solute in the treatment fluid, and wherein the thermally activated acid precursor comprises at least one of an ester linkage or an orthoester linkage;
introducing the treatment fluid into the producing formation; and
introducing an over-flush into the producing formation to push the scale inhibitor further into the producing formation.

16. The method of claim 15, further comprising shutting in the producing formation after the over-flush and then resuming production from the producing formation after the shutting in the producing formation.

17. The method of claim 15, wherein the pre-flush comprises the scale inhibitor in a concentration less than the treatment fluid.

18. The method of claim 15, wherein the thermally activated acid precursor is heated to release an acid by way of hydrolysis that enhances miscibility of the scale inhibitor in the brine.

19. The method of claim 15, wherein the thermally activated acid precursor comprises at least one formate or orthoformate selected from the group consisting of diethylene glycol diformate, diethylene glycol monoformate, monoethylene glycol monoformate, monoethylene glycol diformate, trimethyl orthoformate, triethyl orthoformate, tri-n-propyl orthoformate, tri-n-butyl orthoformate, and combinations thereof.

20. The method of claim 15, wherein the scale inhibitor is allowed to adsorb to at least a portion of the formation, desorb, and form a precipitate upon exposure to water produced by the formation.

* * * * *